United States Patent
Coppini et al.

(10) Patent No.: US 7,148,289 B2
(45) Date of Patent: Dec. 12, 2006

(54) PROPYLENE POLYMER BASED COMPOUNDS AND HEAT-SEALABLE MULTI-LAYER SHEETS CONTAINING THEM

(75) Inventors: Valerio Coppini, Sarralbe (FR); Herve Joseph Gislain Cuypers, Ceroux-Mousty (BE); Olivier Lhost, Havre (BE)

(73) Assignee: BP Belgium NV, Berchem (BE)

( * ) Notice: Subject to any disclaimer, the term of this patent is extended or adjusted under 35 U.S.C. 154(b) by 305 days.

(21) Appl. No.: 10/489,549

(22) PCT Filed: Sep. 23, 2002

(86) PCT No.: PCT/EP02/10678

§ 371 (c)(1),
(2), (4) Date: Mar. 12, 2004

(87) PCT Pub. No.: WO03/029346

PCT Pub. Date: Apr. 10, 2003

(65) Prior Publication Data

US 2006/0079646 A1    Apr. 13, 2006

(30) Foreign Application Priority Data

Sep. 26, 2001 (EP) .................. 01203685

(51) Int. Cl.
*C08L 23/00* (2006.01)
*C08L 23/10* (2006.01)
*C08L 23/12* (2006.01)

(52) U.S. Cl. ..................................... 525/191; 525/240
(58) Field of Classification Search ................ 525/191, 525/240
See application file for complete search history.

(56) References Cited

U.S. PATENT DOCUMENTS

| 5,496,600 A | * | 3/1996 | Peiffer et al. ............... 428/35.7 |
| 6,006,913 A | * | 12/1999 | Ludemann et al. ......... 206/531 |
| 2004/0082723 A1 | * | 4/2004 | Deblauwe et al. .......... 525/240 |

FOREIGN PATENT DOCUMENTS

GB    2116989 A    * 10/1983

* cited by examiner

*Primary Examiner*—Nathan M. Nutter
(74) *Attorney, Agent, or Firm*—James R. Henes

(57) ABSTRACT

A polypropylene composition is disclosed, having a sealing initiation temperature below 80° C., and containing less than 1% by weight of monomeric units derived from ethylene with respect to the total weight of the composition, and comprising:—from 35 to 68% by weight of a random copolymer of propylene (copolymer (A)) containing 16 to 30% by weight of monomeric units derived from I-butene and from 0 to 0.5% by weight of monomeric units derived from ethylene with respect to the total weight of copolymer (A), and—from 65 to 32% by weight of a random copolymer of propylene (copolymer (B)) containing 35 to 55% by weight of monomeric units derived from I-butene and from 0 to 1% by weight of monomeric units derived from ethylene with respect to the total weight of copolymer (B). Heat-sealable sheets containing a sealing layer of the above composition are also disclosed.

10 Claims, No Drawings

PROPYLENE POLYMER BASED COMPOUNDS AND HEAT-SEALABLE MULTI-LAYER SHEETS CONTAINING THEM

The present invention concerns propylene polymer based compounds having a sealing temperature below 80° C. More particularly it concerns compounds containing two random copolymers of propylene of different composition which have both a very low sealing temperature and a broad hot-tack range. The present invention also concerns heat-sealable multi-layer sheets in which at least one heat-sealable layer comprises said compounds.

It is known to use acrylic resins or copolymers of vinylidene chloride for the manufacture of heat-sealable layers (called "sealing layers") of multi-layer sheets for packaging, which have their central layer based on a crystalline polymer of propylene and are generally oriented biaxially (called "BOPP films"), sealing at very low temperature.

The disadvantages of such acrylic resins or copolymers of vinylidene chloride are their cost, plus the cost of application to the central layer of the bioriented film. Moreover, they are not compatible with the polypropylene that essentially constitutes the central layer of the bioriented film, which makes it impossible to recycle the BOPP films thus applied.

Another known practice is to use random co- or terpolymers of propylene containing ethylene or 1-butene. A disadvantage of these random co- and terpolymers is that in order to attain a very low sealing temperature it is necessary to incorporate many comonomers. The resulting low melting point creates problems such as sticking to rollers, either of machines making the sheets or of e.g. automatic dispensers.

Attempts have been made to overcome these disadvantages by using compounds containing two copolymers of propylene containing variable amounts of monomeric units derived from ethylene and/or 1-butene.

GB 2116989A describes a compound based on copolymers of propylene having a sealing temperature below 80° C. However, that compound, containing more than 1% by weight of monomeric units derived from ethylene, demonstrates poor optical properties and low resistance to blocking.

EP-A-0679686 describes compositions based on copolymers of propylene having a sealing temperature below 80° C. However, these compositions are obtained by physical blending of two random copolymers of propylene, one of which is very rich in comonomers and is present in an amount of up to 25%. It is known that this latter copolymer has poor morphology.

Our own FR2819815 discloses a polypropylene composition comprising from 61 to 74% by weight of a random copolymer of propylene (copolymer (A)) containing 8 to 16% by weight of monomeric units derived from 1-butene and less than 0.5% by weight of monomeric units derived from ethylene with respect to the total weight of copolymer (A), and from 26 to 39% by weight of a random copolymer of propylene (copolymer (B)) containing 35 to 50% by weight of monomeric units derived from 1-butene and from 0 to 1% by weight of monomeric units derived from ethylene with respect to the total weight of copolymer (B), wherein the sealing initiation temperature is no more than 100° C. It is stated that the sealing initiation temperature is most often at least 70° C., more particularly at least 80° C.; the two examples have sealing initiation temperatures of 86 and 95° C. There is no specific disclosure of a composition containing 16% 1-butene in copolymer (A) and having a sealing initiation temperature of less than 80° C.

We have now found polypropylene-based compounds which can have sealing temperatures significantly below 80° C. combined with relatively high melting points.

Accordingly in a first aspect the present invention provides a propylene polymer based composition having a sealing temperature below 80° C., said propylene polymer containing less than 1% by weight of monomeric units derived from ethylene with respect to the total weight of the propylene polymer and comprising:

from 35 to 68% by weight of a random copolymer of propylene (copolymer (A)) containing 16 to 30% by weight of monomeric units derived from 1-butene and from 0 to 0.5% by weight of monomeric units derived from ethylene with respect to the total weight of copolymer (A), and from 65 to 32% by weight of a random copolymer of propylene (copolymer (B)) containing 35 to 55% by weight of monomeric units derived from 1-butene and from 0 to 1% by weight of monomeric units derived from ethylene with respect to the total weight of copolymer (B).

For the purposes of the present invention, the sealing initiation temperature (hereinafter SIT) is determined as follows: two coextruded and bioriented films 25 µm thick are placed between the jaws of an OTTO BRUGGER HSG/C welder with two jaws which are heated in such a way that the layers comprising the compound according to the invention are sealed to one another. A pressure of 3 bars is applied for 1 second. After cooling, a tensile test at a rate of 100 mm/min is effected. The SIT is the temperature, expressed in ° C., at which the weld presents a strength of 100 g/cm. The bioriented coextruded films consist of a principal layer of propylene homopolymer (MFI: 2.8 g/10 min) 23 µm thick and a layer of the compound according to the invention 1 µm thick. To make these sheets, stretching in the longitudinal direction and stretching in the transverse direction is applied.

The SIT of the compositions according to the invention is preferably no more than 79° C.; it is advantageously less than 75° C., more particularly less than 70° C.

The propylene polymer used in the compounds according to the invention typically has an ethylene content, determined by infrared spectrometry according to the method described in the examples, not exceeding 0.83% by weight, preferably at most 0.5% by weight, more particularly at most 0.3% by weight with respect to the total weight of the propylene polymer. Propylene polymers not containing ethylene are particularly preferred.

Preferably the amount of 1-butene in copolymer (A) is from 18 to 30% by weight based on the total weight of copolymer (A).

Preferred compositions of the invention comprise:

from 45 to 67% by weight of a propylene/1-butene copolymer (A) containing essentially 84 to 76% by weight of monomeric units derived from propylene and from 18 to 24% by weight of monomeric units derived from 1-butene with respect to the total weight of copolymer (A) and, from 33 to 55% by weight of a random copolymer of propylene (B) containing from 38 to 50% by weight of monomeric units derived from 1-butene and from 0 to 0.5% by weight of monomeric units derived from ethylene with respect to the total weight of copolymer (B).

Preferably, the amount of copolymer (A) in the composition is no more than 60%, more preferably no more than 58%, and most preferably no more than 56% by weight, and the amount of copolymer (B) is at least 40%, more preferably at least 42%, and most preferably at least 44% by weight, based on the total weight of the propylene polymer.

The terms "monomeric units derived from propylene", "monomeric units derived from 1-butene" and monomeric units derived from "ethylene" will be hereinafter replaced respectively by the abbreviations "C3", "C4" and "C2".

Compounds containing larger amounts of copolymer (A) generally have too high a SIT, whereas smaller amounts of copolymer (A) often results in compounds which can stick to the rollers used during the making of the sheets and/or during the storage of packaging made with these sheets. Compounds containing higher contents of C4 in copolymer (A) often have poor morphology and/or catalytic activity. Compounds containing higher contents of C4 in copolymer (B) may have problems of low activity, poor morphology or else of maintaining the reactor in gaseous phase. Smaller contents of C4 in copolymers (A) and (B) may lead to too high a SIT. Higher contents of C2 in copolymers (A) and (B) can result in the too low a melting point and a content of fractions soluble in organic solvents that is too high for the application of sheets intended for food packaging.

The propylene polymer based compounds particularly preferred comprise at least 40% by weight, more particularly at least 45% by weight of copolymer (A). Advantageously, the compounds comprise at most 67% by weight of copolymer (A), and in one embodiment comprise no more than 60% by weight of copolymer (A). Propylene polymer based compounds comprising 45 to 67% by weight of copolymer (A) are particularly preferred.

Copolymer (A) is preferably such that the amount of C4 is at least 18%, but no more than 24% by weight with respect to said copolymer (A). Amounts of at most 24% by weight make it possible to obtain compounds having a good compromise between the melting point and the SIT.

Copolymer (A) may contain up to 0.5% by weight of C2. This low content of C2 improves the printability of sheets made from the compounds. Preferably, the amount of C2 contained in copolymer (A) is at most 0.3% by weight. Copolymers (A) not containing C2 lead to good optical properties.

The amount of copolymer (B) present in the compounds according to the invention is preferably at least 33% by weight, and in one embodiment is at least 40% by weight. Advantageously, the compounds comprise at most 60% by weight, more particularly at most 55% by weight of copolymer (B). Propylene polymer based compounds comprising 33 to 55% by weight of copolymer (B) are particularly preferred.

Copolymer (B) contains preferably at least 38% by weight of C4. Good results are obtained when the amount of C4 in copolymer (B) is at most 50% by weight. Copolymer (B) may also contain 0 to 1% by weight of C2. Advantageously, the content of C2 in copolymer (B) is at most 0.5% by weight. Copolymers (B) not containing C2 are particularly preferred and lead to compounds having an optimum compromise between the melting point and the SIT.

A further aspect of the invention provides a polypropylene composition having a sealing initiation temperature below 80° C., and containing less than 1% by weight of monomeric units derived from ethylene with respect to the total weight of the composition, comprising:
from 35 to 60% by weight of a random copolymer of propylene (copolymer (A)) containing 9 to 30% by weight of monomeric units derived from 1-butene and from 0 to 0.5% by weight of monomeric units derived from ethylene with respect to the total weight of copolymer (A), and
from 65 to 40% by weight of a random copolymer of propylene (copolymer (B)) containing 35 to 55% by weight of monomeric units derived from 1-butene and from 0 to 1% by weight of monomeric units derived from ethylene with respect to the total weight of copolymer (B).

The compounds according to the present invention may contain usual additives such as antioxidants, antiacids, anti-UVs, colourants, filler materials, antistatic agents, lubricating agents or agents that assist sliding. They are generally added by mixing in the molten state, e.g. when making granules from the compounds according to the invention. The MFI of the compounds according to the invention may also, if necessary, be adjusted by mixing preferably in the molten state, with, for instance, a peroxide. The total content of additives does not generally exceed 5% by weight with respect to the total weight of the compound according to the invention. Preferably it does not exceed 2% by weight. Generally, polymers (A) and (B) constitute at least 95% by weight, preferably at least 98% by weight, with respect to the total weight of the compounds. Advantageously, the compounds do not comprise other polymers than polymers (A) and (B).

The compounds according to the invention present generally good optical properties. The haze of the compounds according to the invention is usually at most 1.6%, more particularly at most 1.3%. The haze is determined on coextruded and bioriented films obtained as described above and is measured according to standard ASTM D 1003. Generally, the transparency of the compounds according to the invention, measured according to standard ASTM D 1746 on coextruded and bioriented films obtained as described above, is at least 75%, more particularly at least 78%. Most often, this transparency is at most 100%. The brightness according to standard ASTM D 2457 at 45° on coextruded and bioriented films obtained as described above is most often at least 80%, more particularly at least 85%. Generally, this brightness is at most 100%.

The compounds according to the invention present generally a melt flow index (MFI) measured according to standard ASTM D 1238 (230° C.; 2.16 kg) of at least 0.5 g/10 min, preferably at least 1 g/10 min. The MFI values are typically no more than 20 g/10 min, more usually no more than 15 g/10 min. MFI values of at most 10 g/10 min are particularly preferred.

The hot-tack range of the compounds according to the invention is most often from 85 to 145° C., and more particularly from 90 to 140° C. The hot tack range is determined as follows. A strip 4 cm wide and 29.5 cm long of a coextruded and bioriented film 25 μm thick, obtained according to the method described above in connection with measuring the SIT, is fixed at one end and a weight of 63.3 g hung from the other end. The strip is positioned adjacent the jaws of an OTTO BRUGGER HSG/C welder, such that the two jaws, each 1 cm wide and spaced apart, are touching the strip. The distance between the weight and the lower jaw is 8 cm, the distance between the fixing point of the film and the upper jaw is 11 cm. A horizontal rod is then used to pull the strip transversely between the two jaws, such that the lateral displacement distance of the strip between the jaws is 3 cm, with a portion of the strip pulled across the surface of each jaw. The two jaws are then closed for 0.5 s with a pressure of 5 bars, thereby pressing the two portions of the strip together. Upon opening of the jaws, the percentage of weld remaining intact is measured. This measurement is effected at various temperatures between 60 and 160° C. (lower for lower SIT values) with a spacing of 5° C., and the "hot tack-range" is defined as the range of temperatures within which at least 80% of the weld is observed are intact after opening the jaws.

The melting point (Tf) of the compositions of the invention, measured by differential scanning calorimetry (DSC) according to standard ASTM D 3418, is advantageously at least 100° C., more particularly at least 110° C. Compounds having a Tf below 100° C. may cause sticking problems. The Tf of the compositions of the invention is typically no more than 132° C. and more particularly no more than 130° C. Compounds having a Tf of 115 to 128° C. are particularly preferred because they make it possible to manufacture BOPP films capable of being used on high-throughput packaging machines and do not cause sticking of the packaging during storage.

The propylene polymers used in the compounds according to the invention may be obtained according to any known technique to that end.

Particularly advantageously, the propylene polymer used in the compounds according to the invention is prepared by polymerisation in at least two successive stages, one of the copolymers being prepared in the course of a first stage and the other copolymer being prepared, in the presence of the first, in the course of a subsequent polymerisation stage. Each of these stages may be effected in the same polymerisation medium or in different polymerisation media. Preferably, the preparation of copolymer (A) is carried out first, followed by the preparation of copolymer (B) in the presence of the copolymer (A) arising from the first stage. A particularly preferred mode of preparation of the propylene polymer used in the compounds consists of synthesising successively copolymer (A) then copolymer (B) in the presence of copolymer (A) by polymerisation in gaseous phase, in interconnected successive reactors functioning in agitated bed or preferably in fluidised bed mode. This latter variant does not result in any agglomeration problems and leads to excellent particle size distribution of the propylene polymer used in the compounds according to the invention, so that generally at most 10% by weight of the propylene polymer particles have a size of at least 2000 µm, more particularly at most 20% by weight of the particles have a size of at least 1000 µm. Usually, the particle size distribution of the propylene polymer used in the compounds according to the invention is such that at most 30% by weight of particles have a size of at least 710 µm. The particle size distribution of the propylene polymer used in the compounds according to the invention has been determined by screening according to ASTM D 1921. The good morphology of the propylene polymer used in the compounds according to the invention prevents problems of discharging the polymerisation reactor and problems of feeding the extruders when making granules from these compounds.

The propylene polymer used in the compound according to the invention may be obtained by means of any sufficiently active and productive known catalytic system.

The catalytic systems preferred for preparing the compounds according to the invention comprise:
  a catalytic solid comprising as essential components magnesium, titanium and chlorine,
  an organoaluminium compound, preferably a trialkylaluminium, more particularly triethylaluminium,
  an electrodonor compound (external electrodonor) chosen generally from among alkoxysilanes of formula $R^1_n Si(OR^2)_{4-n}$ in which $R^1$ represents a hydrocarbon group containing from 1 to 12 carbon atoms, $R^2$ represents a hydrocarbon grouping containing from 1 to 8 carbon atoms and n is 1, 2 or 3.

The alkoxysilanes preferred as external electrodonor are alkylalkoxy- and cycloalkylalkoxysilanes, and among these latter di- and trimethoxysilanes are quite particularly preferred. N-propyltrimethoxysilane, dicyclopentyldimethoxysilane and cyclohexylmethyldimethoxysilane give particularly good results.

The catalytic solids usable according to the invention are well known to one skilled in the art. They contain most often an electrodonor compound (internal electrodonor) chosen from among the mono- and diesters of carboxylic aromatic acids, preferably from among dialkyl phthalates, quite particularly diisobutylphthalate. The catalytic solids usable according to the present invention may also contain more or less substantial amounts of preformed polymers arising from a prepolymerisation stage effected at the time of the synthesis of said solid or at the time of a polymerisation stage preceding directly the making of the compounds according to the present invention.

The various constituents of the catalytic system are generally employed in such a way that the atomic ratio between the aluminium of the organoaluminium compound and the titanium of the catalytic solid is from 3 to 300, preferably from 10 to 250 and quite particularly from 15 to 100. Moreover, the molar ratio between the aluminium of the organoaluminium compound and the electrodonor compound is generally from 0.5 to 60, preferably from 1 to 50, quite particularly from 2 to 30.

The other general conditions of polymerisation are well known to one skilled in the art. The temperature is generally from 20 to 150° C., preferably from 40 to 95° C., most often from 50 to 75° C. The polymerisation is generally effected at a pressure higher than atmospheric pressure, preferably from 1 to 30 $10^5$ Pa.

The average molecular weight of the propylene polymer used in the compounds according to the invention may be regulated by adding one or more known molecular weight regulating agents such as hydrogen, diethylzinc, alcohols, ethers and alkyl halogenides. Hydrogen is the most commonly used.

The required amounts of monomers and of molecular weight regulating agent may be introduced continuously or discontinuously into the polymerisation medium.

The compounds according to the invention may possibly be subjected to one or more known treatments with water, an alcohol and/or a hydrocarbon diluent for the elimination of the catalytic residues and/or the low molecular weight fractions.

The compounds according to the invention are particularly well suited for use in the fabrication of heat-sealable sheets and more particularly for the fabrication of multi-layer sheets in which they constitute the sealing layer or layers. Two or more compounds according to the invention may of course be used in the sealing layer or layers.

Accordingly a further aspect of the invention provides multi-layer sheets comprising at least one sealing layer which comprises a compound according to the invention.

The multi-layer sheets generally contain a base of layer which may consist of any polymer material, generally a crystalline polymer of an α-olefin. Preferably, the base sheet consists substantially of a crystalline polymer of propylene. This crystalline polymer of propylene may also be copolymer of propylene, of ethylene and/or of 1-butene, containing in general less than 8% by weight of the comonomers, preferably less than 5% by weight. Naturally the multi-layer sheets may contain, in addition to the basic sheet and the sealing layer or layers comprising the compounds according to the invention, other intermediate layers between the basic sheet and the sealing layer or layers.

The multi-layer sheets according to the invention may be obtained:
- by causing mutual bonding, by pressing between heated rollers, of a prefashioned basic sheet and one or more sheets prefashioned from the compounds according to the invention;
- by coating a basic sheet by means of a solution or dispersion comprising the compounds according to the invention in an organic solvent in order to laminate the compounds according to the invention onto the basic sheet;
- by extruding a layer comprising the compounds according to the invention in molten form in order to laminate it onto the basic sheet;
- by extruding separately the layer or layers comprising the compounds according to the invention and the basic sheet and by joining the molten extrudates via a common die plate;
- by coextruding the layer or layers comprising the compounds according to the invention and the basic sheet via a multi-channel die plate.

The thickness of the multi-layer sheets according to the invention is generally from 5 to 300 µm, preferably from 10 to 170 µm. The thickness of the sealing layer(s) based on the compound according to the invention is generally from 0.1 to 50 µm, preferably from 0.5 to 30 µm. The thickness of the basic sheet is generally from 5 to 200 µm, preferably from 10 to 70 µm.

The multi-layer sheets according to the invention may be used without being stretched. Preferably they are stretched monoaxially and more particularly biaxially, with a view to their orientation, after cladding of the basic sheet by the layer or layers comprising the compounds according to the invention. This stretching may be effected according to any one of the known methods below:
- a layer comprising the compound according to the invention is extruded onto a preformed basic sheet and the multi-layer sheet thus obtained is stretched biaxially;
- a basic sheet is first stretched hot monoaxially in the longitudinal direction ("machine" direction (MD)) by means of a series of rollers including a metal roller; a layer of the compound according to the invention is extruded onto this thus monoaxially stretched sheet, and the multi-layer sheet thus obtained is stretched in the transverse direction (TD);
- the multi-layer sheet obtained by extrusion via a common die plate of the layer or layers comprising the compounds according to the invention and of the basic sheet is stretched biaxially (in the longitudinal direction (MD) and the transverse direction (TD)) in two successive stages or simultaneously.

The latter method is preferred.

The multi-layer sheets thus obtained are appropriate for all packaging applications. They are advantageously used on high-throughput packaging machines. They are particularly well suited for food packaging. The invention therefore also concerns a packaging material based on multi-layer sheets according to the invention.

The following examples serve to illustrate the invention.

In these examples, the MFIs, the SIT's, the Tf's, the particle size distribution, the "hot tack" range, the haze, the transparency and the brightness are measured as described above. The C4 contents of copolymer (A) and of the propylene polymer used in the compound are determined by nuclear magnetic resonance (NMR) and are expressed in % by weight. The C4 content of copolymer (B) is determined from the C4 content of the propylene polymer used in the compound, the C4 content of copolymer (A) and the copolymer (B) content. The copolymer (B) content is determined from the catalytic residues of the propylene polymer used in the compound with respect to copolymer (A). The C2 content is determined by FOURIER transform IR spectrometry from the absorption bands at 733 cm$^{-1}$ and at 720 cm$^{-1}$ and is expressed in % by weight. The C3 content is determined by weight balance and expressed likewise in % by weight.

EXAMPLE 1

A propylene polymer was prepared containing 65% of a copolymer (A) and 35% of a copolymer (B) (all percentages by weight). The copolymer (A) contained 82% of C3 and 18% of C4 and the copolymer (B) contained 56% of C3 and 44% of C4. The total C4 content of the propylene polymer was 27.1%.

The successive preparation of each of the copolymers (A) and (B) was performed in a 5 litre autoclave equipped with an agitating mobile effecting homogenisation of the gaseous reaction medium and containing nitrogen, propylene, 1-butene and hydrogen. The automatic regulation of the monomers (C3 and C4) was effected so as to maintain constant the total pressure of the autoclave. The molar composition of the gaseous phase of the polymerisation autoclave, analysed by mass spectrometry, made it possible to regulate the molar ratios of introduction between C3 and C4 into the gaseous phase of the autoclave. A sample of copolymer (A) was taken for analysis.

The polymerisation conditions appear in Table 1 below.

The catalytic system, introduced under argon into the reaction medium, contained:
- a catalytic solid comprising 2.6% by weight of Ti and 11% by weight of diisobutylphthalate supported on MgCl$_2$,
- triethylaluminium (TEAL), and
- n-propyltrimethoxysilane.

The characteristics of the propylene polymer thus obtained appear in Table 1 below.

In an APV 19TC25 extruder (under nitrogen), a compound consisting of the following was granulated:
- 100 parts by weight of the propylene polymer described above;
- 0.05 part by weight of calcium stearate;
- 0.05 part by weight of dihydrotalcite;
- 0.201 part by weight of stabiliser consisting of one-third by weight of pentaerythrityl tetrakis (3.5-di-tertiary-butyl-4-hydroxyphenylpropionate) and two-thirds by weight of tris(2.4-di-tertiary-butyl-phenyl)phospite (IRGANOX® B215 from the firm CIBA SPECIALTY CHEMICALS);
- 0.101 part by weight of erucamide CRODAMIDE® ER from the firm CRODA;
- 0.126 part by weight of silice SYLOBLOC® 45 from the firm GRACE DAVISON.

The granules thus obtained were used for making an unoriented cast film whose central layer 962 µm thick consisted of a random copolymer of propylene containing about 0.45% by weight of ethylene and characterised by an MFI of 2.8 g/10 min, an outer layer 25 µm thick consisted of the compound described above and the opposite other outer layer 12 µm thick consisted of a random terpolymer ELTEX® P KS 300 marketed by the firm SOLVAY POLY-OLEFINS EUROPE. Samples of 8.5×8.5 cm² were taken from the cast film and were stretched on a KARO® IV biorientation frame (5.5 times in the coextrusion direction and 8 times in the transverse direction) marketed by the firm BRUECKNER Maschinenbau GmbH. The characteristics of the sealing layer comprising the compound according to the invention of the BOPP film thus obtained appear in Table 2 below. It should be noted that the brightness was measured on the face of the biloriented film containing the compound.

EXAMPLE 2

A propylene polymer comprising the following (percentages by weight) was prepared as follows:

55% of a copolymer (A) and 45% of a copolymer (B). The copolymer (A) contained 82% of C3 and 18% of C4 and the copolymer (B) contained 61% of C3 and 39% of C4. The total C4 content of the propylene polymer was 27.5%.

The successive preparation of each of the copolymers (A) and (B) was performed according to the general conditions set out in Example 1.

The polymerisation conditions appear in Table 1.

This propylene polymer was granulated in the conditions described in Example 1. The compound thus obtained, the MFI of which was 3.2 g/10 min, was used for making a BOPP film as described in Example 1, the sealing layer of which presented the characteristics set out in Table 2.

EXAMPLE 3

A propylene polymer comprising the following (percentages by weight) was prepared as follows:

50% of a copolymer (A) and 50% of a copolymer (B). The copolymer (A) contained 82% of C3 and 18% of C4 and the copolymer (B) contained 55% of C3 and 45% of C4. The total C4 content of the propylene polymer was 31.5%.

The successive preparation of each of the copolymers (A) and (B) was performed according to the general conditions set out in Example 1.

In an APV 19TC25 extruder (under nitrogen), a compound consisting of the following was granulated:
  100 parts by weight of the propylene polymer described above;
  0.05 parts by weight of dihydrotalcite;
  0.101 parts by weight of pentaerythritol tetrakis(3-(3,5-di-tert-butyl-4-hydroxyphenyl)propionate) (IRGANOX® 1010 from CIBA SPECIALITY CHEMICALS)
  0.07 parts (in weight) of tetrakis(2,4-di-tert-butylphenyl) [1,1-biphenyl]-4,4'-diylbisphosphonite (IRGAFOS® P-EPQ from CIBA SPECIALITY CHEMICALS)
MFI measured on pellets was 10.1 g/10 min.
Melting point: two maxima appeared in the DSC measurement, 65.1 and 124.0° C.
Associated melting enthalpy: 61.2 J/g The pellets thus obtained were then used for the production of a three-layer cast film with a total thickness close to 1 mm:
  the layer in contact with the chill roll (thickness close to 35 µm) was made with the pellets described above;
  the internal layer was made with ELTEX® P HL402N6986 (a homopolymer without technical additives) produced and commercialised by SOLVAY POLYOLEFINS EUROPE;
  the last layer (thickness close to 35 µm) was made with ELTEX® P KS407 also produced and commercialised by SOLVAY POLYOLEFINS EUROPE.

8.5 cm² squares samples were cut from this cast film. They were stretched on a KARO IV laboratory stretcher (5.5 times in coextrusion direction and 8 times in the transverse direction) made by BRUECKNER Maschinenbau GmbH.

The characteristics of the sealing layer comprising the compound according to the invention of the BOPP film thus obtained appear in Table 2 below.

EXAMPLE 4

A propylene polymer comprising the following (percentages by weight) was prepared as follows:

50% of a copolymer (A) and 50% of a copolymer (B). The copolymer (A) contained 80% of C3 and 20% of C4 and the copolymer (B) contained 55% of C3 and 45% of C4. The total C4 content of the propylene polymer was 32.5%.

The successive preparation of each of the copolymers (A) and (B) was performed according to the general conditions set out in Example 1.

Pellets and films were then prepared as described in Example 4.

The MFI measured on pellets was 4.1 g/10 min. The melting point by DSC measurement gave two maxima, at 66.3 and 119.7° C. Associated melting enthalpy is 58.4 J/g.

The characteristics of the sealing layer comprising the compound according to the invention of the BOPP film thus obtained appear in Table 2 below.

EXAMPLE 5

A propylene polymer comprising the following (percentages by weight) was prepared as follows:

55% of a copolymer (A) and 45% of a copolymer (B). The copolymer (A) contained 80% of C3 and 20% of C4 and the copolymer (B) contained 55% of C3 and 45% of C4. The total C4 content of the propylene polymer was 31.5%.

The successive preparation of each of the copolymers (A) and (B) was performed according to the general conditions set out in Example 1.

Pellets and films were then prepared as described in Example 4.

The MFI measured on pellets was 4.3 g/10 min. The melting point by DSC measurement gave two maxima, at 65.4 and 119.7° C. Associated melting enthalpy is 59.6 J/g.

EXAMPLE 6R

This example is given by way of comparison.

A propylene polymer comprising only one copolymer containing (percentages by weight) 81% of C3, 18.4% of C4 and 0.6% of C2 was prepared as follows.

The preparation of this copolymer was performed in a continuously running reactor with fluidised beds that was equipped with a gas distribution grille. A gaseous shuttle containing nitrogen, propylene, 1-butene, ethylene and hydrogen, in stable stationary concentration, was made to circulate through this reactor, via a compressor.

The polymerisation conditions and the characteristics of the copolymer thus obtained appear in Table 1.

This copolymer was granulated in the conditions described in example 1 except that the necessary amount of 2.5-dimethyl-2.5-di(tertiary butyl peroxy)hexane was added in order to obtain granules whose MFI was 7.1 g/10 min. The granules thus obtained were used for making a BOPP film as described in example 1, the sealing layer of which presented the characteristics set out in Table 2.

The relatively high SIT of this compound is a handicap for its use as heat-sealable film on very high-throughput packaging machines.

TABLE 1

|  | Unit | Ex. 1 | Ex. 2 | Ex. 3 | Ex. 4 | Ex. 5 | Ex. 6R |
|---|---|---|---|---|---|---|---|
| Copolymer (A) | % weight | 65 | 55 | 50 | 50 | 55 | 100 |
| H2/C3 | % mol/mol | 0.3 | 0.3 | 0.3 | 0.3 | 0.3 | 1.1 |
| C4/C3 | % mol/mol | 27 | 27 | 27 | 31 | 31 | 30.2 |
| Temperature | ° C. | 70 | 70 | 70 | 70 | 70 | 60 |
| Al/Ti | Mol/mol | 35 | 35 | 35 | 35 | 35 | 50 |
| Al/Si | Mol/mol | 5 | 5 | 5 | 5 | 5 | 3.5 |
| Dwell time | Hour | 1 | 1 | 1 | 1 | 1 | 2 |
| C2 in (A) | % weight | 0 | 0 | 0 | 0 | 0 | 0.6 |
| C4 in (A) | % weight | 18 | 18 | 18 | 20 | 20 | 18.4 |
| Copolymer (B) | % weight | 35 | 45 | 50 | 50 | 45 | 0 |
| H2/C3 | % mol/mol | 0.8 | 0.8 | 0.8 | 0.8 | 0.8 | — |
| C4/C3 | % mol/mol | 75 | 75 | 75 | 75 | 75 | — |
| Temperature | ° C. | 70 | 70 | 70 | 70 | 70 | — |
| Al/Ti | Mol/mol | 35 | 35 | 35 | 35 | 35 | — |
| Al/Si | Mol/mol | 5 | 5 | 5 | 5 | 5 | — |
| Dwell time | Hour | 1 | 2 | adjusted for B/A ratio | | | — |
| C4 | % weight | 44 | 39 | 45 | 45 | 45 | — |
| Propylene polymer in BOPP film | | | | | | | |
| C2 | % weight | 0 | 0 | 0 | 0 | 0 | 0.6 |
| C4 | % weight | 27.1 | 27.5 | 31.5 | 32.5 | 31.25 | 18.4 |
| Tf | ° C. | 122 | 122.7 | 124.0 | 119.7 | 119.7 | 116.8 |
| MFI | g/10 min | 3.3 | 3.2 | 10.1 | 4.1 | 4.3 | 3.5 |
| Pcl size > 2000 μm* | % weight | 100 | NM | NM | NM | NM | — |
| Pcl size > 1000 μm* | % weight | 87.4 | NM | NM | NM | NM | — |
| Pcl size > 710 μm* | % weight | 79.7 | NM | NM | NM | NM | — |

*screen mesh aperture
NM = not measured

TABLE 2

|  | Ex. 1 | Ex. 2 | Ex. 3 | Ex. 4 | Ex. 5 | Ex. 6R |
|---|---|---|---|---|---|---|
| MFI (g/10 min) | 3.3 | 3.2 | 10.1 | 4.1 | 4.3 | 7.1 |
| SIT (° C.) | 79 | 77 | 65 | 66 | 65 | 92 |
| Hot tack range (° C.) | 85–147 | 79–146 | 68–144 | 69–138 | 69–133 | 89–139 |
| Haze (%) | 1 | 1 | 1.4 | 0.68 | 0.65 | 1 |
| Brightness (%) | 93 | 92 | 86 | 91 | 88 | 92 |

TABLE 2-continued

|  | Ex. 1 | Ex. 2 | Ex. 3 | Ex. 4 | Ex. 5 | Ex. 6R |
|---|---|---|---|---|---|---|
| Transparency (%) | 81 | 80 | 62 | 77 | 73 | 80 |

The invention claimed is:

1. A polypropylene composition having a sealing initiation temperature below 80° C., and containing less than 1% by weight of monomeric units derived from ethylene with respect to the total weight of the composition consisting essentially of:
   from 35 to 58% by weight of a random copolymer of propylene (copolymer (A)) containing from 9 to 30% by weight of monomeric units derived from 1-butene and from 0 to 0.5% by weight of monomeric units derived from ethylene with respect to the total weight of copolymer (A), and
   from 65 to 42% by weight of a random copolymer of propylene (copolymer (B)) containing 35 to 55% by weight of monomeric units derived from 1-butene and from 0 to 0.5% by weight of monomeric units derived from ethylene with respect to the total weight of copolymer (B).

2. The composition according to claim 1, wherein the amount of copolymer (A) is from no more than 56% by weight, and the amount of copolymer (B) is at least 44% by weight, based on the total weight of the composition.

3. The composition according to claim 1, wherein the amount of monomeric units derived from 1-butene in copolymer (B) is from 38 to 47% by weight based on the total weight of copolymer (B).

4. The composition according to claim 1, having a sealing initiation temperature of less than 75° C.

5. The composition according to claim 1, having a melting point of at least 110° C.

6. The composition according to claim 1, having a melt flow index (MFI), measured according to standard ASTM D 1238 (230° C.; charge: 2.16 kg) of from 1 g/10 min to 10 g/10 min.

7. The composition according to claim 1, having a hot-tack range of 90 to 140° C.

8. Heat-sealable multi-layer sheets comprising at least one sealing layer comprising a compound of claim 1.

9. Packaging material comprising a sheet of claim 8.

10. A process for the production of a composition of claim 1, comprising the steps of successively forming copolymer (A) and then copolymer (B) in the presence of copolymer (A) by polymerization in the gaseous phase, in interconnected successive reactors.

* * * * *